(12) United States Patent
Nishimura et al.

(10) Patent No.: US 11,399,459 B2
(45) Date of Patent: Aug. 2, 2022

(54) PRIME MOVER OF WORK MACHINE

(71) Applicant: HONDA MOTOR CO., LTD., Tokyo (JP)

(72) Inventors: Kenta Nishimura, Wako (JP); Yasumi Fukuzumi, Wako (JP); Yoshihiro Takahashi, Wako (JP); Koki Tsuruda, Wako (JP); Fumio Minami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 221 days.

(21) Appl. No.: 16/955,099

(22) PCT Filed: Dec. 22, 2017

(86) PCT No.: PCT/JP2017/046240
§ 371 (c)(1),
(2) Date: Jun. 18, 2020

(87) PCT Pub. No.: WO2019/123658
PCT Pub. Date: Jun. 27, 2019

(65) Prior Publication Data
US 2020/0383266 A1    Dec. 10, 2020

(51) Int. Cl.
*F01P 5/06* (2006.01)
*A01D 34/68* (2006.01)
(Continued)

(52) U.S. Cl.
CPC .............. *A01D 34/78* (2013.01); *F01P 5/06* (2013.01); *H02K 9/06* (2013.01)

(58) Field of Classification Search
CPC .... A01D 2101/00; A01D 34/81; A01D 34/68; A01D 34/6806; A01D 75/187; H02K 9/06; F01P 5/06
See application file for complete search history.

(56) References Cited

U.S. PATENT DOCUMENTS 5,317,860 A    6/1994 Dunn
9,379,596 B2   6/2016 Kraetzig
(Continued)

FOREIGN PATENT DOCUMENTS

EP    0481655    4/1992
EP    2653024    10/2013
(Continued)

OTHER PUBLICATIONS

Chinese Office Action and Search Report for Chinese Patent Application No. 201780097905.7 dated Nov. 25, 2021.
(Continued)

*Primary Examiner* — Long T Tran
(74) *Attorney, Agent, or Firm* — Amin, Turocy & Watson, LLP

(57) ABSTRACT

A prime mover of a mower that is a work machine comprises: a motor having a motor rotation shaft extended along a substantially vertical direction, and a motor housing disposed coaxially with the motor rotation shaft; a centrifugal fan disposed above the motor; and a motor cover that accommodates the motor and the centrifugal fan so as to extend to the upper end of a side part of the centrifugal fan. A cooling air inlet is formed in the motor housing, the centrifugal fan having a base part provided above the cooling air inlet, and the outer diameter of the base part being greater than the outer diameter of the cooling air inlet.

13 Claims, 6 Drawing Sheets

(51) Int. Cl.
H02K 9/06 (2006.01)
A01D 34/78 (2006.01)

(56) References Cited

U.S. PATENT DOCUMENTS

| | | | | |
|---|---|---|---|---|
| 2007/0104593 A1* | 5/2007 | Yamaguchi | ......... | F04D 25/0653 |
| | | | | 417/354 |
| 2008/0106159 A1* | 5/2008 | Yoshida | ................... | H02K 9/22 |
| | | | | 310/64 |
| 2013/0270933 A1* | 10/2013 | Kraetzig | .................. | H02K 9/28 |
| | | | | 310/227 |
| 2019/0113045 A1* | 4/2019 | Diehl | ................ | F04D 29/5806 |
| 2020/0177052 A1* | 6/2020 | Fujiwara | .................. | H02K 5/20 |
| 2020/0288634 A1* | 9/2020 | Hasegawa | ............... | A01D 34/81 |
| 2020/0328649 A1* | 10/2020 | Johansen | ................. | H02K 9/06 |

FOREIGN PATENT DOCUMENTS

| | | |
|---|---|---|
| GB | 2318967 | 5/1998 |
| JP | 51-006070 | 1/1976 |
| JP | 02-127109 | 10/1990 |
| JP | 03-086762 | 9/1991 |
| JP | 06-113641 | 4/1994 |
| JP | 06-028984 | 8/1994 |
| JP | 5271517 | 8/2013 |

OTHER PUBLICATIONS

International Search Report and Written Opinion for International Application No. PCT/JP2017/046240 dated Apr. 3, 2018, 10 pages.
Extended European Search Report for European Patent Application No. 17935564.9 dated Dec. 4, 2020.

* cited by examiner

PRIME MOVER OF WORK MACHINE

TECHNICAL FIELD

The present invention relates to a prime mover of a work machine such as a lawn mower.

BACKGROUND ART

A lawn mower includes a motor for rotating a cutter blade for cutting the grass on lawns. The temperature of such a motor may become high depending on the conditions in which it is used. Japanese Patent No. 5271517 discloses a prime mover for a lawn mower in which a suction-type fan is provided under a motor in order to cause a flow of cooling air inside the motor.

SUMMARY OF INVENTION

Causing a flow of cooling air inside the motor under the action of a fan may cause foreign matter, such as mown grass, dirt, dust, rain water, etc., to flow into the motor together with the cooling air. When a mesh filter member is provided to prevent the entry of foreign matter into the motor, cleaning the filter member is necessary. Further, the motor cannot be cooled sufficiently if the filter member is clogged.

The present invention has been made considering such a problem, and an object of the present invention is to provide a prime mover of a work machine that can prevent the entry of foreign matter into the motor and can cool the motor effectively with a simple structure.

In order to achieve the object above, a prime mover of a work machine according to the present invention includes: a motor including a motor rotary shaft extending along substantially a vertical direction, and a motor housing disposed coaxially with the motor rotary shaft; a centrifugal fan disposed above the motor; and a motor cover accommodating the motor and the centrifugal fan in such a manner that the motor cover extends to an upper end of a side portion of the centrifugal fan, wherein a cooling air inlet is formed in the motor housing, the centrifugal fan includes a base located above the cooling air inlet, and the base has an outer diameter that is larger than an outer diameter of the cooling air inlet.

According to the configuration above, since the base of the centrifugal fan is disposed above the cooling air inlet, it is possible to reduce the inflow of foreign matter into the motor from above through the cooling air inlet. Furthermore, foreign matter is pushed out radially outward by the centrifugal fan together with the cooling air, to the wall of the motor cover, and therefore cooling air containing no foreign matter can efficiently flow into the cooling air inlet located under the centrifugal fan. It is thus possible to prevent the foreign matter from flowing into the motor and to effectively cool the motor with a simple structure.

In the work machine prime mover above, the centrifugal fan may be disposed coaxially with the motor rotary shaft.

According to the configuration above, it is possible to efficiently cause the cooling air to flow into the motor from the cooling air inlet. Further, the centrifugal fan can effectively reduce the inflow of foreign matter into the motor from the cooling air inlet.

In the work machine prime mover above, the motor may include a rotor attached to the motor rotary shaft, and a stator provided on an outer circumferential side of the rotor, and the outer diameter of the base may be larger than an outer diameter of the stator.

According to the configuration above, the centrifugal fan can further effectively reduce the inflow of foreign matter into the motor from the cooling air inlet.

In the work machine prime mover above, the motor cover may have a peripheral wall formed to cover an outer circumferential portion of the centrifugal fan and part of an area above the centrifugal fan, a cooling air introducing port may be formed in a portion of the motor cover, the portion being above the centrifugal fan, and the cooling air introducing port may have a diameter that is smaller than the outer diameter of the base.

According to the configuration above, it is possible to cause foreign matter entering the motor cover to flow radially outward together with the cooling air by the action of the centrifugal fan and to efficiently push out the foreign matter to the wall of the motor cover.

In the work machine prime mover above, the motor cover may have formed therein a cooling passage positioned inside the motor housing; and a foreign matter discharge passage positioned outside of the motor housing and located in parallel with the cooling passage, a throttle member may be provided in the foreign matter discharge passage, and a passage sectional area of the foreign matter discharge passage on the upstream side of the throttle member may be larger than a passage sectional area of the foreign matter discharge passage at a position of the throttle member.

According to the configuration above, the throttle member increases the passage resistance of the foreign matter discharge passage and so the cooling air containing no foreign matter can be efficiently guided into the cooling passage.

In the work machine prime mover above, the throttle member and an inner surface of the motor cover may form an orifice therebetween.

According to the configuration above, the orifice can be formed of a simple structure.

In the work machine prime mover above, the peripheral wall of the motor cover may be formed of a plurality of steps in such a manner that the peripheral wall expands downward in side view, and the throttle member may be disposed at an interval from an inner side of a horizontal surface of a step portion, which is one of the plurality of steps.

According to the configuration above, it is possible to further increase the passage resistance of the foreign matter discharge passage and hence to further efficiently guide the cooling air containing no foreign matter into the cooling passage.

In the work machine prime mover above, the throttle member may be formed like a circular ring.

According to the configuration above, it is possible to effectively increase the passage resistance of the foreign matter discharge passage.

In the work machine prime mover above, the throttle member may include: a projection projecting radially outward from the motor housing; and an extending portion extending downward from a projecting end of the projection, and the orifice may be formed between the extending portion and the inner surface of the motor cover.

According to the configuration above, the orifice can be formed of a simple structure.

In the work machine prime mover above, an upper surface of the projection may be inclined downward in a radially outward direction.

According to the configuration above, it is possible to reduce accumulation of foreign matter on the upper surface of the projection.

The work machine prime mover above may include a housing covering an upper part of the motor cover, and an air intake port directed downward may be formed in the housing.

According to the configuration above, it is possible to reduce the inflow of foreign matter into the housing from the air intake port and into the motor.

In the work machine prime mover above, the outer diameter of the base may be substantially identical to an outer diameter of the motor housing, and an outer circumferential surface of the base may be positioned right above an outer circumferential surface of the motor housing.

The configuration above makes it possible to simplify the structure of the motor cover accommodating the centrifugal fan and the motor and to thereby enable cost reduction. Further, this prevents foreign matter guided from the centrifugal fan from getting caught on the motor housing.

In the work machine prime mover above, the work machine may be a lawn mower.

This configuration can provide a lawn mower that offers the effects recited above.

DESCRIPTION OF EMBODIMENTS

The work machine according to the present invention will be described below referring to the accompanying drawings in conjunction with preferred embodiments.

Figure 1:
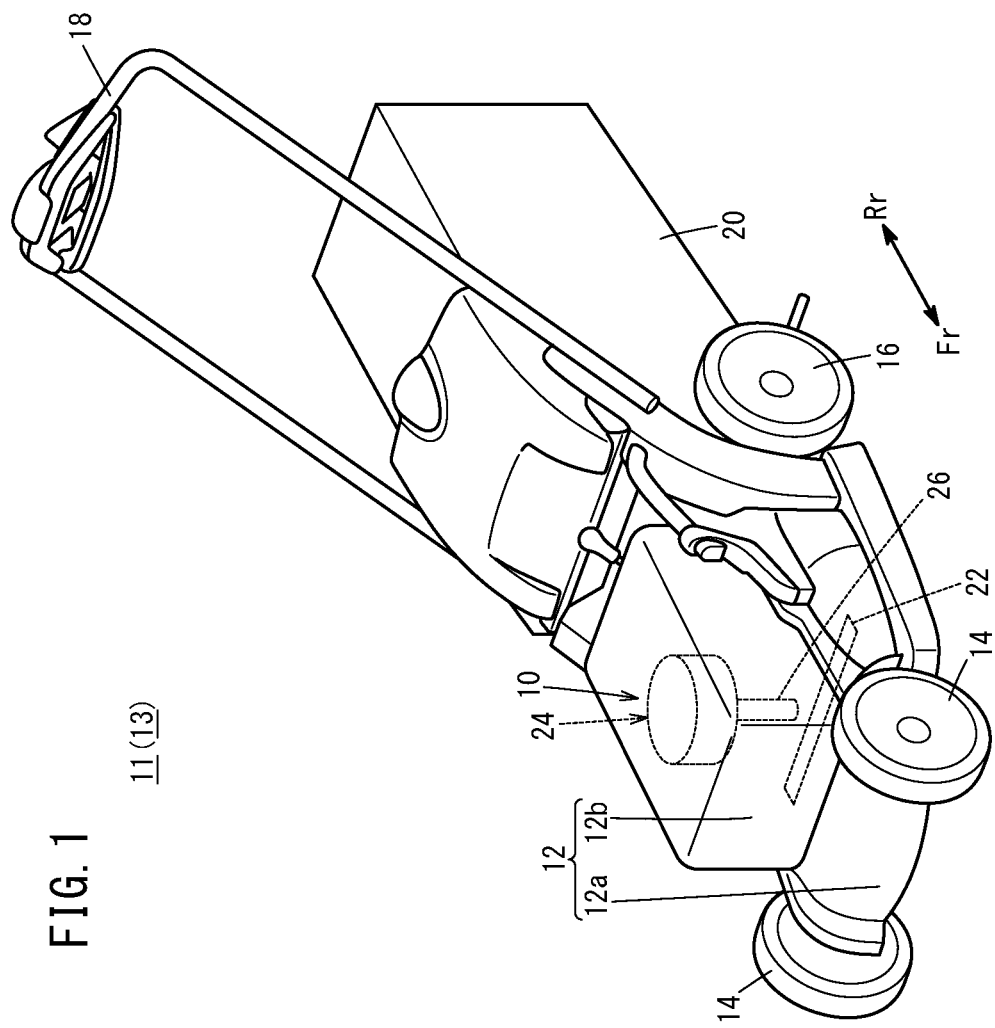
FIG. 1 is a perspective view of a lawn mower having a motor cooling structure according to an embodiment of the present invention.

As shown in FIG. 1, a work machine 13 is a walk-type lawn mower 11 for cutting the grass on lawns. Note that the work machine 13 is not limited to the lawn mower 11 but may be a grass cutter, snow blower, a cultivator, etc. In FIG. 1, the arrow Fr shows the forward direction of the lawn mower 11 (the same direction as the forward direction seen from an operator), and the arrow Rr shows the rearward direction of the lawn mower 11 (the same direction as the rearward direction seen from the operator).

The lawn mower 11 includes a prime mover 10 having a housing 12, left and right front wheels 14 disposed in the front part of the housing 12, left and right rear wheels 16 disposed in the rear part of the housing 12, an operation handle 18 extending rearward from the housing 12, and a mown grass storage 20 attached at the rear of the housing 12.

The housing 12 includes a lower housing 12a and an upper housing 12b. The lower housing 12a is a casing that is opened downward only in a part facing the ground (lawn). The lower housing 12a contains a mowing cutter blade 22. The cutter blade 22 is coupled to an output shaft 26 of a motor 24 through a blade holder not shown. The cutter blade 22 is a plate-like elongated member (so-called bar blade).

Figure 2:
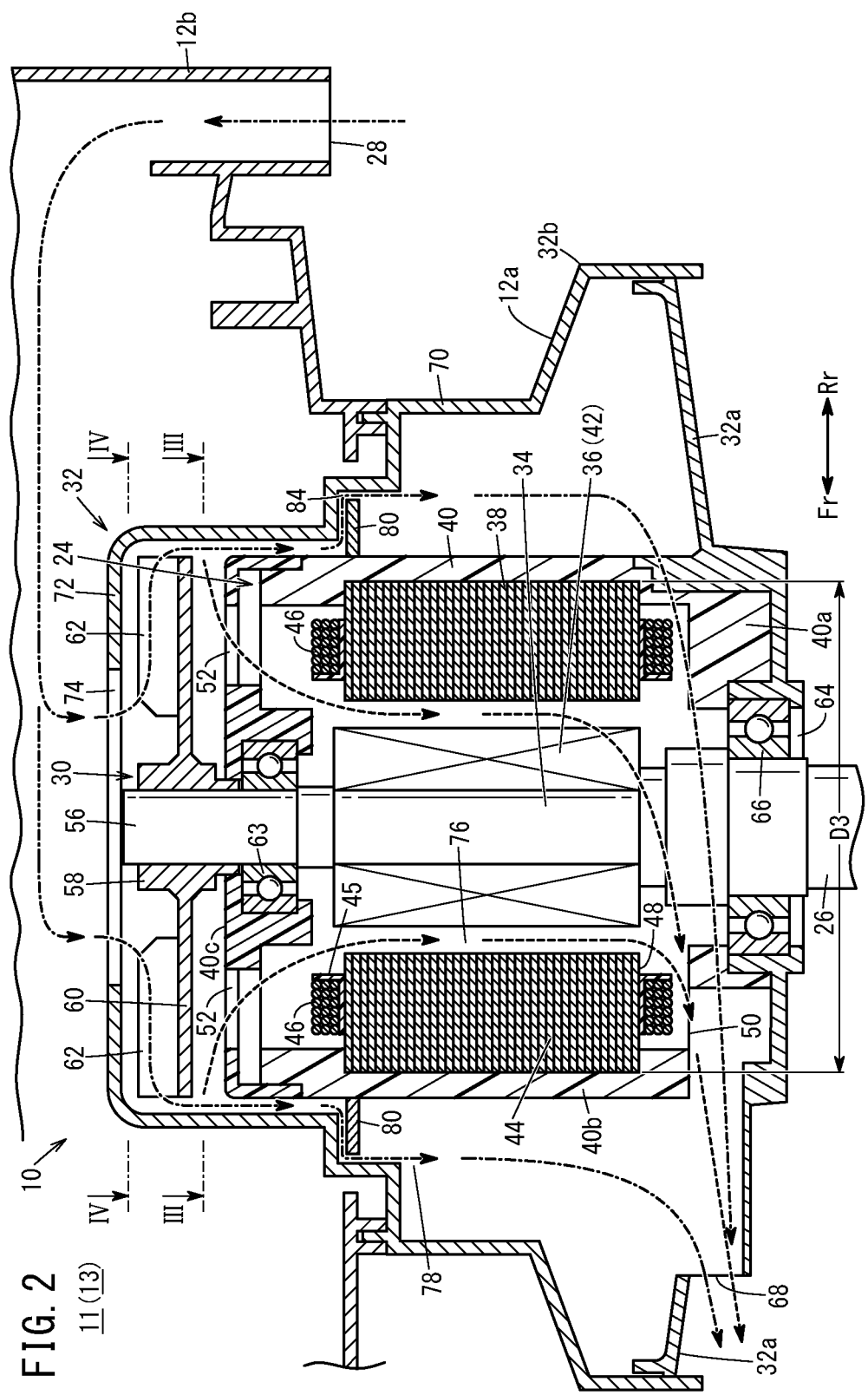
FIG. 2 is a partially omitted longitudinal cross section illustrating a main part of the lawn mower of FIG. 1.

In FIG. 2, the upper housing 12b has an air intake port 28 formed in its rear part so as to introduce cooling air (outside air) into the upper housing 12b. The prime mover 10 includes the motor 24 serving as a driving source of the cutter blade 22 and the rear wheels 16, a centrifugal fan 30 attached to the motor 24, and a motor cover 32 accommodating the motor 24 and the centrifugal fan 30.

The motor 24 is driven by electric power supplied from a battery not shown. The motor 24 is constructed as a so-called inner-rotor type motor. The motor 24 includes a motor rotary shaft 34, a rotor 36, a stator 38, and a motor housing 40.

The motor rotary shaft 34 extends in a substantially vertical direction. The output shaft 26 projecting below the motor housing 40 is coupled to the lower end of the motor rotary shaft 34. The output shaft 26 extends into the lower housing 12a. The driving force generated by the motor 24 is transmitted to the left and right rear wheels 16 as a travel driving force through a travel power transmission mechanism (not shown) coupled to the output shaft 26. The driving force generated by the motor 24 may be transmitted to the left and right front wheels 14.

The rotor 36 has permanent magnets 42 arranged at the outer circumferential surface of the motor rotary shaft 34. The permanent magnets 42 are arranged such that the N- and S-poles are disposed alternately in the circumferential direction of the motor rotary shaft 34.

The stator 38 includes an iron core 44 formed of a stack of multiple steel sheets, and a plurality of stator coils 46 attached to the iron core 44 through an insulator 45. The iron core 44 has a plurality of salient poles (poles) 48 protruding radially inward from its outer circumferential portion. The plurality of salient poles 48 are arranged at equal intervals in the circumferential direction of the stator 38. The stator coils 46 are formed by winding conducting wires around the salient poles 48 with the insulator 45 therebetween.

The motor housing 40 is disposed coaxially with the motor rotary shaft 34. The motor housing 40 is provided in the motor cover 32 and supports the stator 38. The motor housing 40 includes a bottom wall 40a positioned below the stator 38, a side wall 40b projecting upward from the bottom wall 40a so as to cover the outer circumferential surface of the stator 38, and a top wall 40c provided at the top end of the side wall 40b. The bottom wall 40a has formed therein a cooling air discharge outlet 50 for discharging the cooling air in the motor 24 to the outside.

Figure 3:
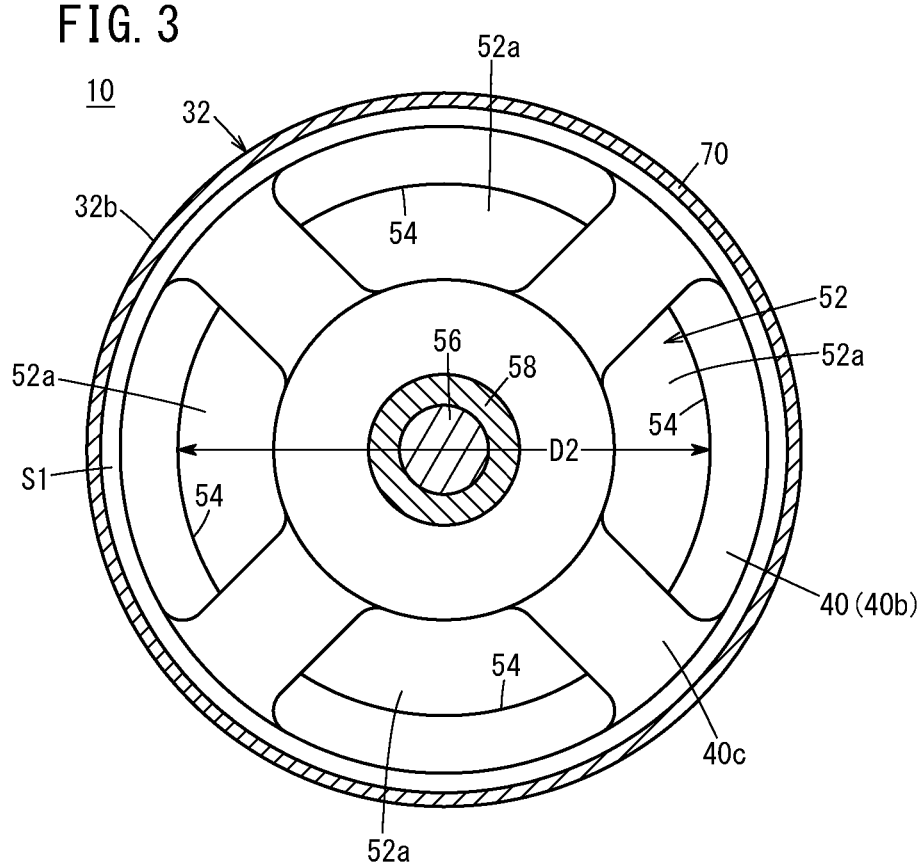
FIG. 3 is a lateral cross section taken along line III-III in FIG. 2.

As shown in FIGS. 2 and 3, a cooling air inlet 52 for taking the cooling air into the motor 24 is formed in the top wall 40c. The cooling air inlet 52 has a plurality of (four in the example of FIG. 3) openings 52a formed in the circumferential direction. The openings 52a are positioned above the stator 38. An outer circumferential part 54 forming each opening 52a extends like a circular arc along the circumferential direction of the motor rotary shaft 34. In other words, the outer circumferential parts 54 are formed of the top end of the side wall 40b of the motor housing 40.

Figure 4:
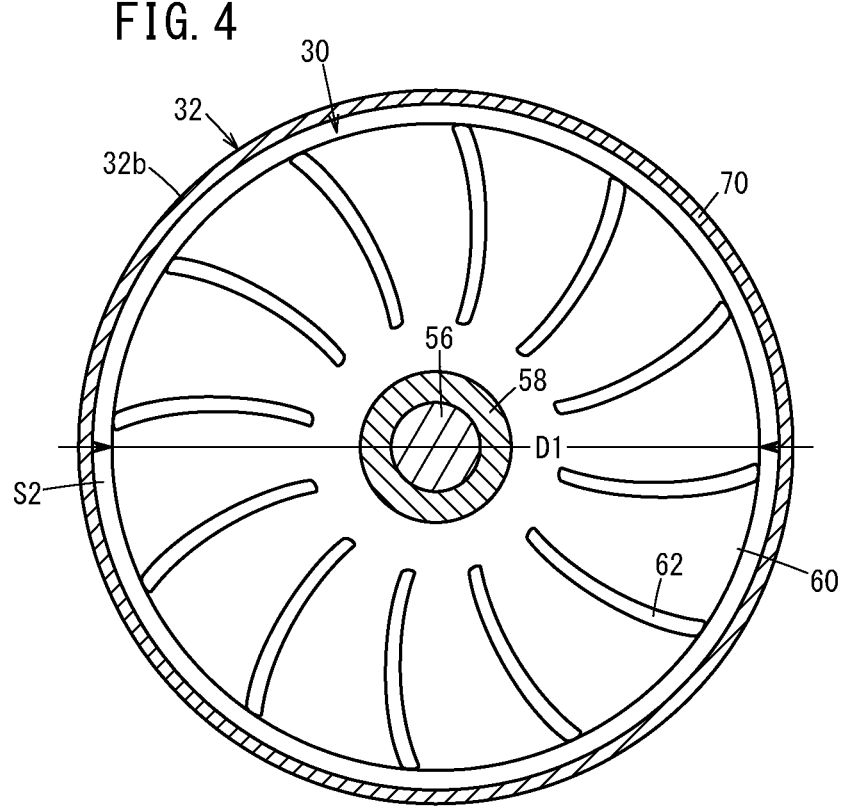
FIG. 4 is a lateral cross section taken along line IV-IV in FIG. 2.

As shown in FIGS. 2 and 4, the centrifugal fan 30 is disposed above the motor 24 and sends cooling air into the motor 24. The centrifugal fan 30 includes a fan rotary shaft 56, a hub 58, a base 60, and blades 62. The fan rotary shaft 56 is rotatably supported by a bearing 63 (see FIG. 2) provided in the top wall 40c in such a manner that the fan rotary shaft 56 projects upward from the top end of the motor rotary shaft 34. That is, the centrifugal fan 30 is disposed coaxially with the motor rotary shaft 34 and rotates integrally with the motor rotary shaft 34.

The hub 58 is shaped like a cylinder and fixed to the fan rotary shaft 56. The base 60 is a plate-like member provided on the outer circumferential surface of the hub 58. The base 60 is formed like a circular ring. The base 60 covers the entire cooling air inlet 52 from above. In other words, the base 60 has an outer diameter D1 that is larger than an outer diameter D2 of the cooling air inlet 52 (the diameter of a circle along the outer circumferential parts 54: see FIGS. 2 to 4). In other words, the outer diameter D1 of the base 60 is larger than an outer diameter D3 of the stator 38. The outer diameter D1 of the base 60 is substantially the same as the outer diameter of the side wall 40b of the motor housing 40. That is, the outer circumferential surface of the base 60 is positioned right above the outer circumferential surface of the motor housing 40.

The plurality of blades 62 are provided on the upper surface of the base 60. Each blade 62 extends from the inner circumferential portion of the base 60 to the outer edge of the base 60. Each blade 62 extends radially outward, curving in the rotating direction of the base 60 (see FIG. 4).

As shown in FIG. 2, the upper portion of the motor cover 32 is covered by the upper housing 12b. The motor cover 32 includes a lower cover 32a and an upper cover 32b. The lower cover 32a is attached to the upper cover 32b to cover the motor 24 from below. The motor housing 40 is fixed to the lower cover 32a. The lower cover 32a has an insertion hole 64 through which the output shaft 26 passes, and a bearing 66 rotatably supporting the output shaft 26. The lower cover 32a has formed therein a cooling air exit port 68 for guiding the cooling air in the motor cover 32 to the outside.

The upper cover 32b includes a peripheral wall 70 covering the motor 24 and the centrifugal fan 30 from the side, and an outer circumference cover portion 72 covering the outer circumferential portion of the centrifugal fan 30 from above. That is, the upper cover 32b extends to the top end of the side of the centrifugal fan 30. The peripheral wall 70 is formed to cover the outer circumferential portion of the centrifugal fan 30 and part of the area above the centrifugal fan 30. The peripheral wall 70 is formed of a plurality of steps such that it expands downward in side view. The peripheral wall 70 is fixed to the upper housing 12b.

The lower cover 32a is provided along the entire circumference of the lower end of the upper cover 32b. An annular first space S1 is formed between the peripheral wall 70 and the upper end of the side wall 40b of the motor housing 40 (see FIG. 3). An annular second space S2 is formed between the peripheral wall 70 and the base 60 of the centrifugal fan 30 (see FIG. 4).

The outer circumference cover portion 72 is provided at the top end of the peripheral wall 70. A cooling air introducing port 74 for introducing cooling air into the motor cover 32 is formed in the center portion of the outer circumference cover portion 72. The diameter of the cooling air introducing port 74 is smaller than the outer diameter D1 of the base 60 of the centrifugal fan 30. In this embodiment, the cooling air introducing port 74 is formed in the shape of a perfect circle, but the cooling air introducing port 74 may be formed in other shapes, such as an ellipse, polygon, etc. When the cooling air introducing port 74 is not a perfect circle, the diameter of the cooling air introducing port 74 is the length of the widest part of the cooling air introducing port 74.

The motor cover 32 includes a cooling passage 76 which is located inside the motor housing 40 and in which cooling air flows, and a foreign matter discharge passage 78 positioned outside of the motor housing 40 and located in parallel with the cooling passage 76.

A throttle member 80 forming an orifice 84 is provided in the foreign matter discharge passage 78. The throttle member 80 is a plate-like member formed like a circular ring and is fixed to the side wall 40b of the motor housing 40. The throttle member 80 is located below the first space S1 and the second space S2.

Figure 5:
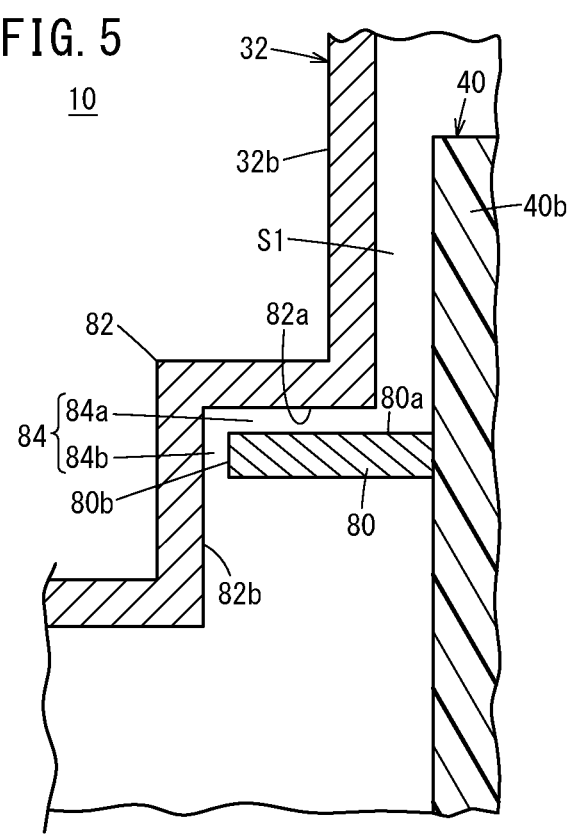
FIG. 5 is an enlarged view of a throttle member of FIG. 2 and its vicinity.

As shown in FIG. 5, the throttle member 80 is positioned at a step portion 82 of the peripheral wall 70. Specifically, an upper surface 80a of the throttle member 80 faces, at an interval, a downward-facing first step inner surface 82a (horizontal surface) of the step portion 82. That is, an annular first throttle passage 84a is formed between the upper surface 80a of the throttle member 80 and the first step inner surface 82a. The passage sectional area of the first throttle passage 84a is smaller than the passage sectional area of the second space S2. The interval between the upper surface 80a of the throttle member 80 and the first step inner surface 82a is sized so that foreign matter, such as mown grass, dirt, dust, rain water, etc., can pass therethrough.

An outer side surface 80b of the throttle member 80 faces, at an interval, a second step inner surface 82b of the step portion 82 that faces the motor 24. That is, an annular second throttle passage 84b is formed between the outer side surface 80b of the throttle member 80 and the second step inner surface 82b. The passage sectional area of the second throttle passage 84b is smaller than the passage sectional area of the second space S2, and substantially the same as the passage sectional area of the first throttle passage 84a. The interval between the outer side surface 80b of the throttle member 80 and the second step inner surface 82b is sized so that foreign matter, such as mown grass, dirt, dust, rain water, etc., can flow therethrough, and the interval is substantially the same as the interval between the upper surface 80a of the throttle member 80 and the first step inner surface 82a. The first throttle passage 84a and the second throttle passage 84b form the orifice 84. That is, the passage sectional area of the foreign matter discharge passage 78 on the upstream side of the throttle member 80 is larger than the passage sectional area of the foreign matter discharge passage 78 at the position of the throttle member 80.

Next, operations of the lawn mower 11 constructed as above will be described.

With the lawn mower 11 shown in FIG. 1, when the cutter blade 22 rotates clockwise in plan view under the driving action of the motor 24, the cutter blade 22 cuts the grass growing on the lawn right beneath the lawn mower 11. At this time, an air current (swirling wind) swirling in the same direction as the cutter blade 22 is generated inside the lower housing 12a. Then, the cut grass (mown grass) is sent into the mown grass storage 20 by the conveying wind (swirling wind) thus generated.

The centrifugal fan 30 rotates as the motor rotary shaft 34 rotates. Then, as shown in FIG. 2, outside air (air) is taken into the upper housing 12b through the air intake port 28, and the air inside the upper housing 12b is introduced as cooling air into the motor cover 32 through the cooling air introducing port 74. The cooling air contains foreign matter, such as mown grass, dirt and dust blown up during work, rain water, etc.

The cooling air introduced into the motor cover 32 is pushed out radially outward by the blades 62 of the centrifugal fan 30, while swirling along the circumferential direction around the fan rotary shaft 56. That is, an eddy of cooling air is formed by the centrifugal fan 30. The cooling air that has been pushed out outward in the radial direction of the centrifugal fan 30 hits the inner surface of the peripheral wall 70 of the motor cover 32 and flows downward through the second space S2 between the peripheral wall 70 and the centrifugal fan 30. At this time, the foreign matter, which has larger mass than air, flows like an eddy along the inner surface of the peripheral wall 70 by the centrifugal force. The cooling air guided from the second space S2 separates off into the cooling passage 76 and the foreign matter discharge passage 78.

The cooling air containing no foreign matter flows in the cooling passage 76, and the cooling air containing foreign matter flows in the foreign matter discharge passage 78. The cooling air containing foreign matter and guided into the foreign matter discharge passage 78 flows downward in the first space S1 along the inner surface of the side wall, passes through the orifice 84 (first throttle passage 84a and second throttle passage 84b), and flows into the bottom space in the motor cover 32. At this time, the orifice 84 increases the passage resistance of the foreign matter discharge passage 78. The foreign matter guided to the bottom portion of the motor cover 32 through the orifice 84 moves in the housing 12 while whirling in the eddy of cooling air, and is discharged out of the motor cover 32 from the cooling air exit port 68.

The cooling air containing no foreign matter and guided into the cooling passage 76, is guided to the back of the centrifugal fan 30 by the effect of the orifice 84 of the foreign matter discharge passage 78, and then flows into the motor 24 from the cooling air inlet 52 formed in the top wall 40c of the motor housing 40. The cooling air flowing into the motor 24 flows downward through the space between the rotor 36 and the stator 38, and the space between the stator coils 46, thereby cooling the stator 38 (stator coils 46). The cooling air, which has cooled the stator 38, is discharged out of the motor housing 40 from the cooling air discharge outlet 50, meets the cooling air guided from the foreign matter discharge passage 78, and flows out of the motor cover 32 from the cooling air exit port 68.

Note that, with the lawn mower 11, a battery (not shown) is installed and removed by opening the upper cover 32b. In this work, foreign matter flowing into the motor cover 32 from above through the cooling air introducing port 74 remains on the top surface of the base 60 of the centrifugal fan 30. Then, when the motor 24 is driven, the foreign matter remaining on the top surface of the base 60 moves in the motor cover 32 while whirling in the eddy of cooling air and is discharged out of the motor cover 32 from the cooling air exit port 68.

In this case, the lawn mower 11 according to the embodiment offers the effects below.

The cooling air inlet 52 is formed in the motor housing 40, and the outer diameter D1 of the base 60 is larger than the outer diameter D2 of the cooling air inlet 52. This configuration reduces the inflow of foreign matter into the motor 24 from above through the cooling air inlet 52.

Furthermore, foreign matter is pushed out radially outward by the centrifugal fan 30 together with the cooling air, to the inner surface of the peripheral wall 70 of the motor cover 32, and therefore cooling air containing no foreign matter can efficiently flow into the cooling air inlet 52 located under the centrifugal fan 30. It is hence possible to prevent the foreign matter from flowing into the motor 24 and to effectively cool the motor 24 with a simple structure.

The centrifugal fan 30 is disposed coaxially with the motor rotary shaft 34. It is therefore possible to efficiently cause the cooling air to flow into the motor 24 from the cooling air inlet 52. Further, the centrifugal fan 30 can effectively reduce the inflow of foreign matter into the motor 24 from the cooling air inlet 52.

The motor 24 includes the rotor 36 attached to the motor rotary shaft 34, and the stator 38 provided on the outer circumferential side of the rotor 36. The outer diameter D1 of the base 60 is larger than the outer diameter D3 of the stator 38. This allows the centrifugal fan 30 to further effectively reduce the inflow of foreign matter into the motor 24 from the cooling air inlet 52.

The peripheral wall 70 of the motor cover 32 is formed to cover the outer circumferential portion of the centrifugal fan 30 and part of the area above the centrifugal fan 30. The cooling air introducing port 74 is formed in a portion of the motor cover 32, the portion being above the centrifugal fan 30, and the cooling air introducing port 74 has a diameter that is smaller than the outer diameter D1 of the base 60. It is thus possible to cause foreign matter entering the motor cover 32 to flow radially outward together with the cooling air by the action of the centrifugal fan 30 and to efficiently push out the foreign matter to the peripheral wall 70 of the motor cover 32.

The motor cover 32 has formed therein the cooling passage 76 positioned inside the motor housing 40, and the foreign matter discharge passage 78 positioned outside of the motor housing 40 and located in parallel with the cooling passage 76. The throttle member 80 is provided in the foreign matter discharge passage 78, and the passage sectional area of the foreign matter discharge passage 78 on the upstream side of the throttle member 80 is larger than the passage sectional area of the foreign matter discharge passage 78 at the position of the throttle member 80. Thus, the throttle member 80 increases the passage resistance of the foreign matter discharge passage 78 and so the cooling air containing no foreign matter can be efficiently guided into the cooling passage 76.

The throttle member 80 and the peripheral wall 70 of the motor cover 32 form the orifice 84 therebetween. The orifice 84 is thus formed of a simple structure. The throttle member 80 is formed like a circular ring and therefore effectively increases the passage resistance of the foreign matter discharge passage 78.

The peripheral wall 70 of the motor cover 32 is formed of a plurality of steps in such a manner that the peripheral wall 70 expands downward in side view, and the throttle member 80 is disposed at an interval from the inner side of the horizontal surface of the step portion 82, which is one of the plurality of steps. This further increases the passage resistance of the foreign matter discharge passage 78 and makes it possible to further efficiently guide the cooling air containing no foreign matter into the cooling passage 76.

The prime mover 10 of the lawn mower 11 includes the upper housing 12b covering an upper part of the motor cover 32, and the air intake port 28 directed downward is formed in the upper housing 12b. This reduces the inflow of foreign matter into the lower housing 12a from the air intake port 28 and into the motor 24.

The outer diameter D1 of the base 60 is substantially identical to the outer diameter D3 of the motor housing 40, and the outer circumferential surface of the base 60 is positioned right above the outer circumferential surface of the motor housing 40. This makes it possible to simplify the structure of the motor cover 32 accommodating the centrifugal fan 30 and the motor 24 and to thereby reduce cost. Further, this prevents foreign matter guided from the centrifugal fan 30 from getting caught on the motor housing 40.

Figure 6:
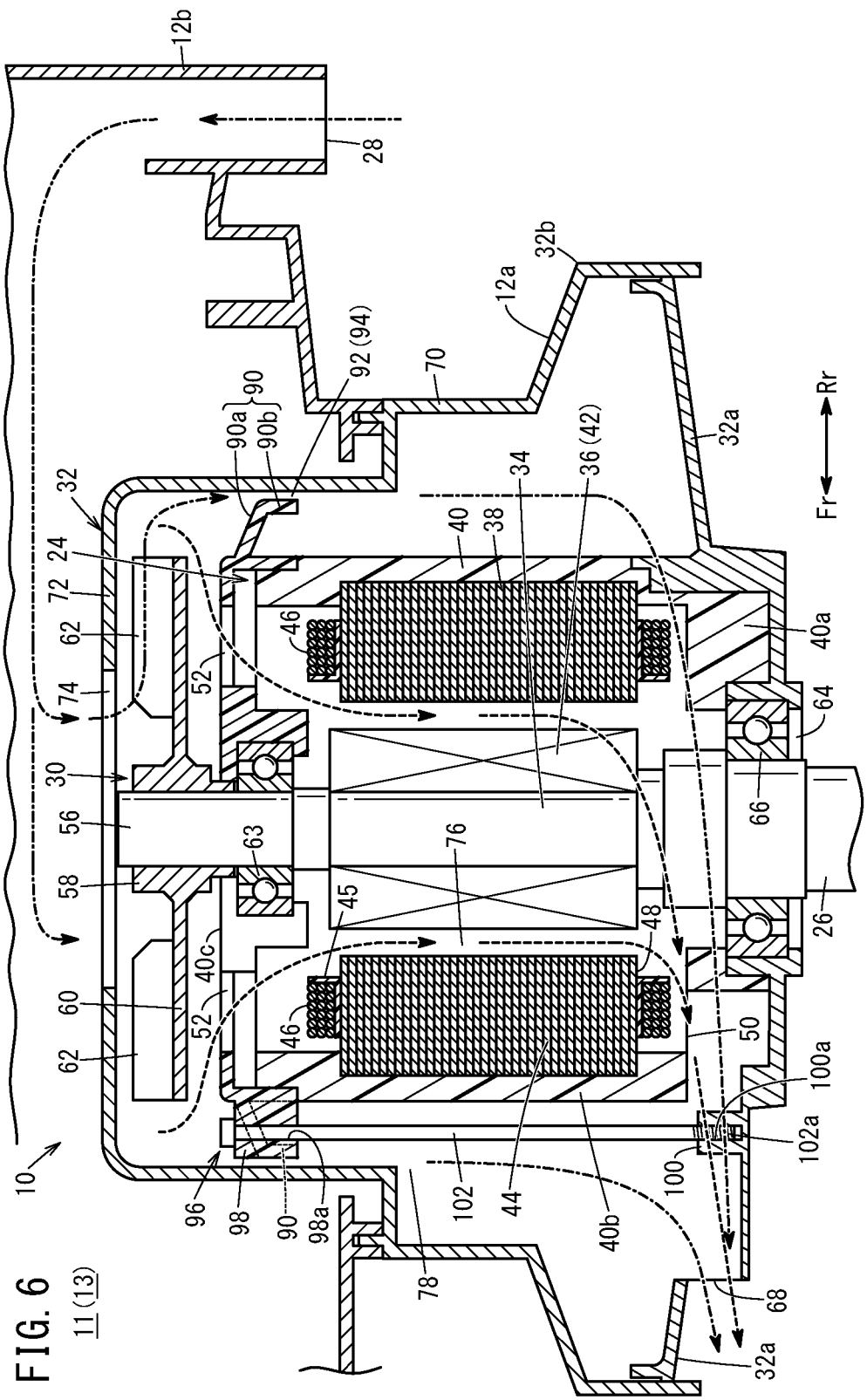
FIG. 6 is a partially omitted longitudinal cross section illustrating a main part of a lawn mower having a throttle member according to a modification.

The present invention is not limited to the configurations described above. As shown in FIG. 6, the prime mover 10 of the lawn mower 11 may include a throttle member 90 in place of the throttle member 80. The throttle member 90 is provided integrally with the top wall 40c of the motor housing 40. The throttle member 90 is shaped in the form of a circular ring. The throttle member 90 includes a projection 90a projecting radially outward from the outer peripheral surface of the top wall 40c, and an extending portion 90b extending downward from the projecting end of the projection 90a.

The outer circumferential portion of the projection 90a is positioned radially outside the base 60. The upper surface of the projection 90a is inclined downward in the radially outward direction. This reduces accumulation of foreign matter on the top surface of the projection 90a. The outer surface of the extending portion 90b faces, at an interval, the inner surface of the peripheral wall 70 of the motor cover 32. That is, an annular throttle passage 92 is formed between the outer surface of the extending portion 90b and the inner surface of the peripheral wall 70. The throttle passage 92 forms an orifice 94.

The passage sectional area of the throttle passage 92 is smaller than the passage sectional area of the second space S2. The interval between the outer surface of the extending portion 90b and the inner surface of the peripheral wall 70 is sized so that foreign matter, such as mown grass, dirt, dust, rain water, etc., can pass therethrough. That is, the passage sectional area of the foreign matter discharge passage 78 on the upstream side of the throttle member 90 is larger than the passage sectional area of the foreign matter discharge passage 78 at the position of the throttle member 90.

The prime mover 10 with the throttle member 90 further includes a plurality of fixing parts 96 for fixing the motor 24 to the motor cover 32. The fixing parts 96 are positioned at equal intervals along the circumferential direction of the motor housing 40, for example. The fixing parts 96 each include a first supporting portion 98, a second supporting portion 100, and a bolt 102.

The first supporting portion 98 is provided at the throttle member 90. In other words, the first supporting portion 98 is provided at the top wall 40c of the motor housing 40. The first supporting portion 98 has a hole 98a through which the bolt 102 passes vertically. The second supporting portion 100 protrudes upward from the inner surface of the lower cover 32a of the motor cover 32. The second supporting portion 100 has a threaded hole 100a into which a threaded portion 102a of the bolt 102 is screwed. According to this configuration, the motor 24 can be firmly fixed to the motor cover 32 by the fixing parts 96.

The motor 24 is not limited to inner-rotor type but may be of outer-rotor type. The throttle member 80 may be fixed to the peripheral wall 70 of the motor cover 32 at an interval from the side wall 40b of the motor housing 40. In this case, the orifice 84 is formed between the throttle member 80 and the side wall 40b. The cooling air inlet 52 may be formed in the side wall 40b of the motor housing 40.

The prime mover of a work machine according to the present invention is not limited to the embodiments described above, but can of course adopt various configurations without departing from the essence and gist of the present invention.

What is claim is:

1. A prime mover of a work machine, comprising:
   a motor including a motor rotary shaft extending along substantially a vertical direction, and a motor housing disposed coaxially with the motor rotary shaft;
   a centrifugal fan disposed above the motor; and
   a motor cover accommodating the motor and the centrifugal fan in such a manner that the motor cover extends to an upper end of a side portion of the centrifugal fan,
   wherein a cooling air inlet is formed in the motor housing,
   the centrifugal fan includes a base located above the cooling air inlet, and
   the base has an outer diameter that is larger than an outer diameter of the cooling air inlet.

2. The prime mover of the work machine according to claim 1, wherein the centrifugal fan is disposed coaxially with the motor rotary shaft.

3. The prime mover of the work machine according to claim 1,
   wherein the motor includes:
   a rotor attached to the motor rotary shaft; and
   a stator provided on an outer circumferential side of the rotor, and
   the outer diameter of the base is larger than an outer diameter of the stator.

4. The prime mover of the work machine according to claim 1, wherein
   the motor cover has a peripheral wall formed to cover an outer circumferential portion of the centrifugal fan and part of an area above the centrifugal fan,
   a cooling air introducing port is formed in a portion of the motor cover, the portion being above the centrifugal fan, and
   the cooling air introducing port has a diameter that is smaller than the outer diameter of the base.

5. The prime mover of the work machine according to claim 1,
   wherein the motor cover has formed therein:
   a cooling passage positioned inside the motor housing; and
   a foreign matter discharge passage positioned outside of the motor housing and located in parallel with the cooling passage,
   a throttle member is provided in the foreign matter discharge passage, and
   a passage sectional area of the foreign matter discharge passage on an upstream side of the throttle member is larger than a passage sectional area of the foreign matter discharge passage at a position of the throttle member.

6. The prime mover of the work machine according to claim 5, wherein the throttle member and an inner surface of the motor cover form an orifice therebetween.

7. The prime mover of the work machine according to claim 6, wherein
   a peripheral wall of the motor cover is formed of a plurality of steps in such a manner that the peripheral wall expands downward in side view, and
   the throttle member is disposed at an interval from an inner side of a horizontal surface of a step portion, which is one of the plurality of steps.

8. The prime mover of the work machine according to claim 6, wherein
   the throttle member includes:
   a projection projecting radially outward from the motor housing; and
   an extending portion extending downward from a projecting end of the projection, and
   the orifice is formed between the extending portion and the inner surface of the motor cover.

9. The prime mover of the work machine according to claim 8, wherein an upper surface of the projection is inclined downward in a radially outward direction.

10. The prime mover of the work machine according to claim 5, wherein the throttle member is formed like a circular ring.

11. The prime mover of the work machine according to claim 1, further comprising a housing covering an upper part of the motor cover, wherein an air intake port directed downward is formed in the housing.

12. The prime mover of the work machine according to claim 1, wherein the outer diameter of the base is substantially identical to an outer diameter of the motor housing, and an outer circumferential surface of the base is positioned right above an outer circumferential surface of the motor housing.

13. The prime mover of the work machine according to claim 1, wherein the work machine is a lawn mower.

\* \* \* \* \*